Jan. 17, 1928.

Re. 16,850

P. R. FORMAN

DOOR OPERATING MECHANISM

Original Filed Jan. 6, 1926 7 Sheets-Sheet 1.

Inventor.
Paris R. Forman

By his Attorneys Darby & Darby.

Jan. 17, 1928.
Re. 16,850
P. R. FORMAN
DOOR OPERATING MECHANISM
Original Filed Jan. 6, 1926 7 Sheets-Sheet 2
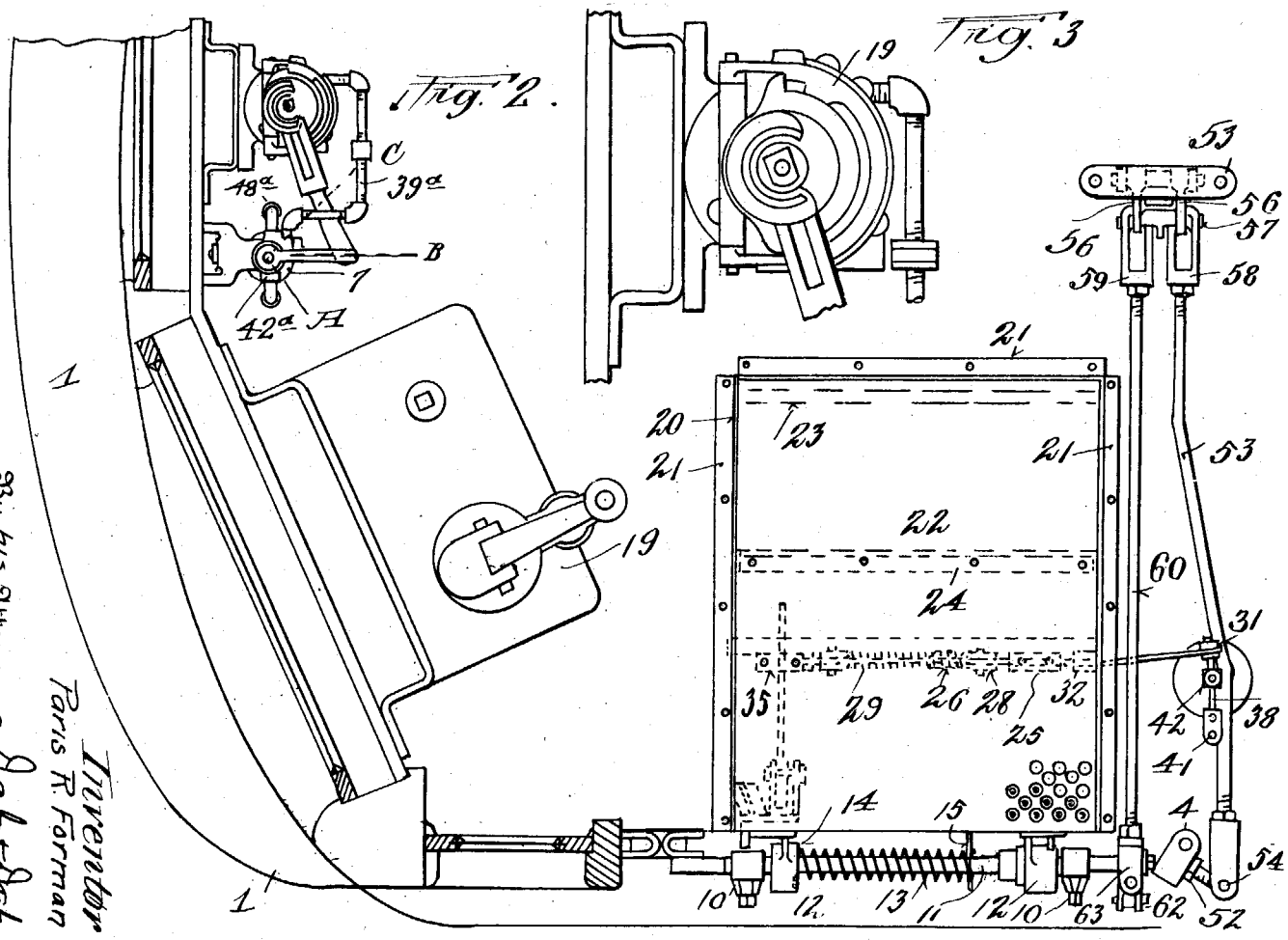
Inventor
Paris R. Forman
By his Attorneys Daly & Daly Jan. 17, 1928.
Re. 16,850
P. R. FORMAN
DOOR OPERATING MECHANISM
Original Filed Jan. 6, 1926 7 Sheets-Sheet 3
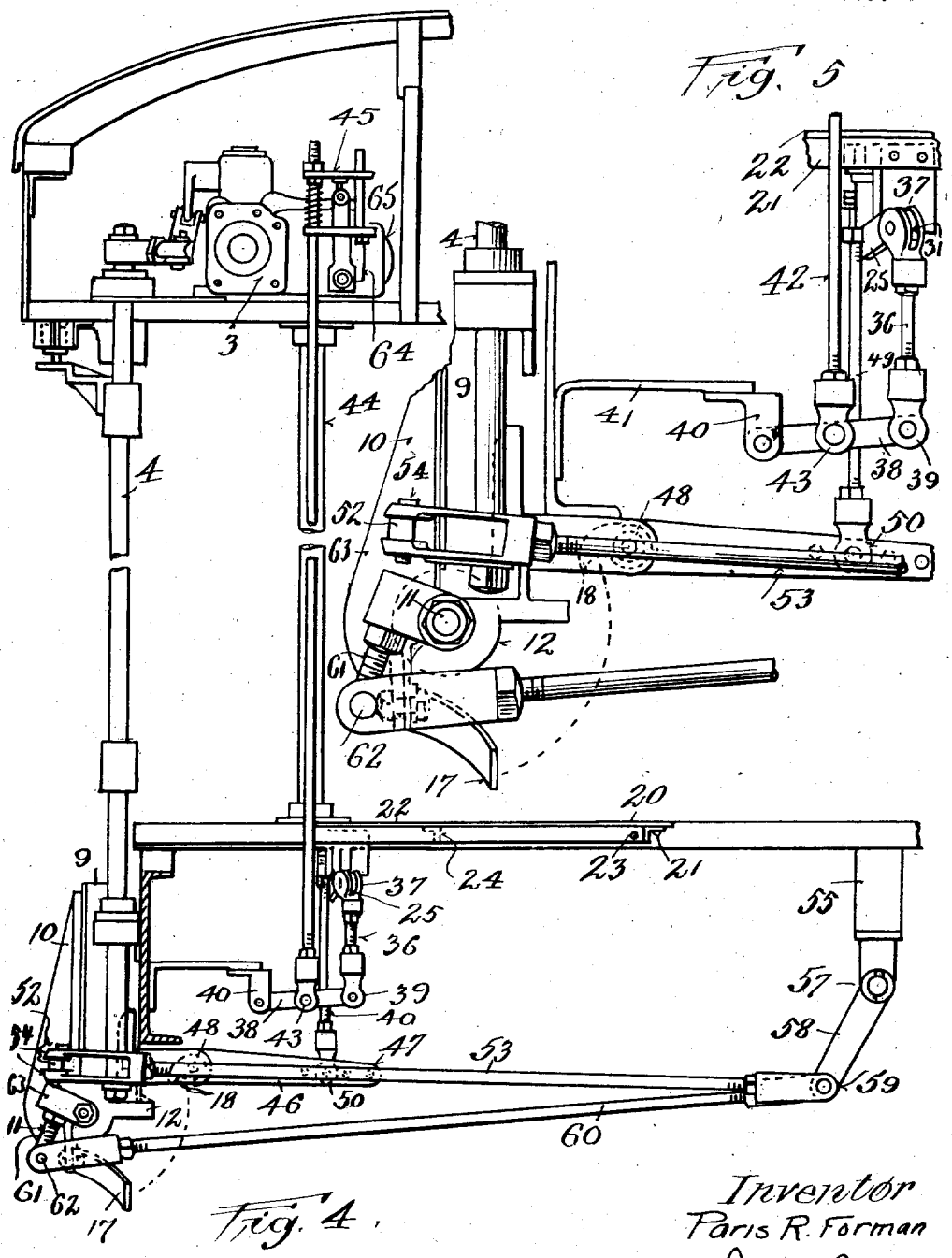
Inventor
Paris R. Forman
By his Attorneys Daly & Daly.

Jan. 17, 1928.

Re. 16,850

P. R. FORMAN

DOOR OPERATING MECHANISM

Original Filed Jan. 6. 1926 7 Sheets-Sheet 4

Inventor
Paris R. Forman
By his Attorneys Darby & Darby

Jan. 17, 1928.
Re. 16,850
P. R. FORMAN
DOOR OPERATING MECHANISM
Original Filed Jan. 6, 1926 7 Sheets-Sheet 5
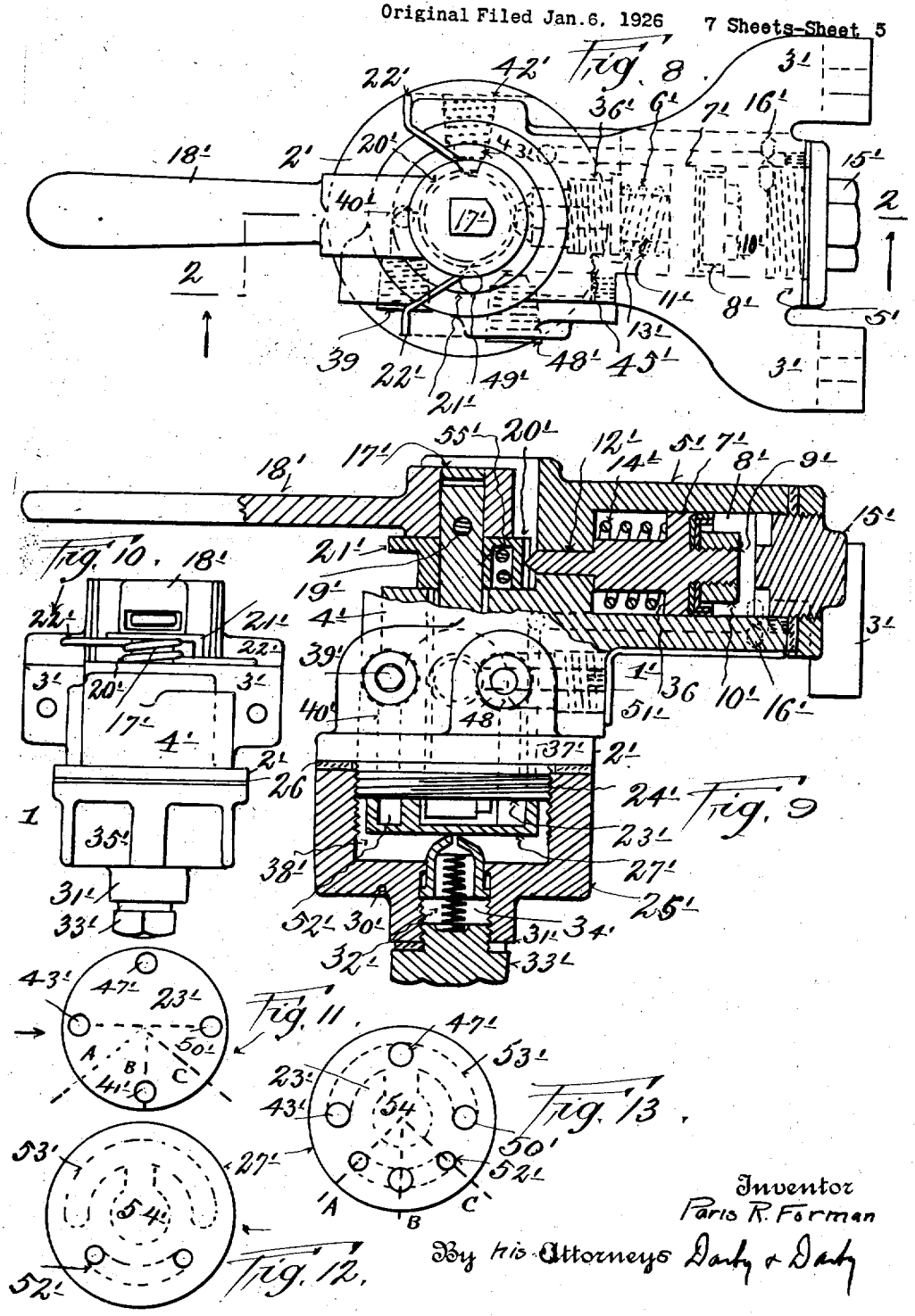
Inventor
Paris R. Forman
By his Attorneys Darby & Darby Jan. 17, 1928.
P. R. FORMAN
Re. 16,850
DOOR OPERATING MECHANISM
Original Filed Jan. 6, 1926 7 Sheets-Sheet 6
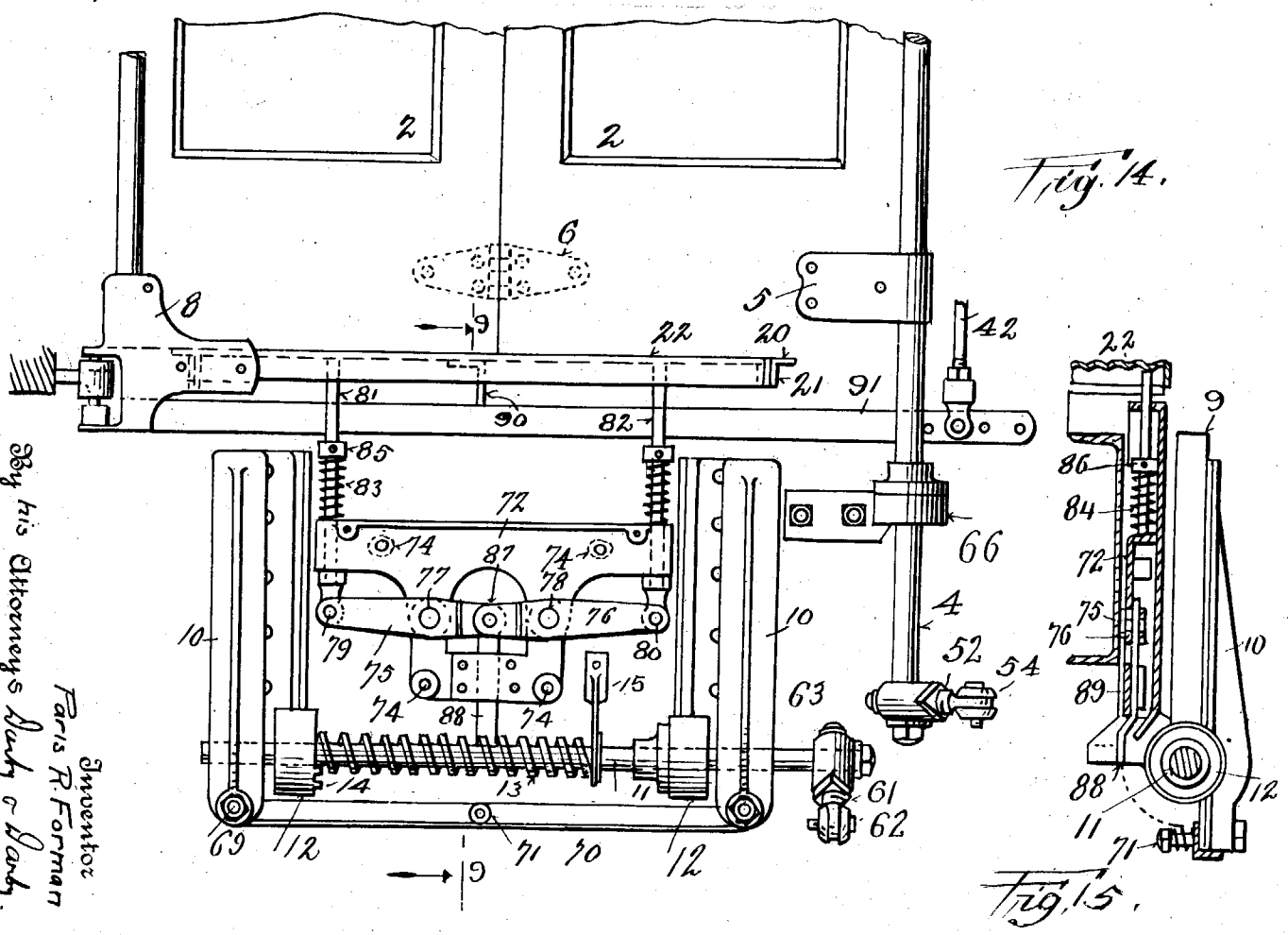
Inventor
Paris R. Forman
By his Attorneys Darby & Darby.

Jan. 17, 1928.
P. R. FORMAN
Re. 16,850
DOOR OPERATING MECHANISM
Original Filed Jan. 6, 1926
7 Sheets-Sheet 7
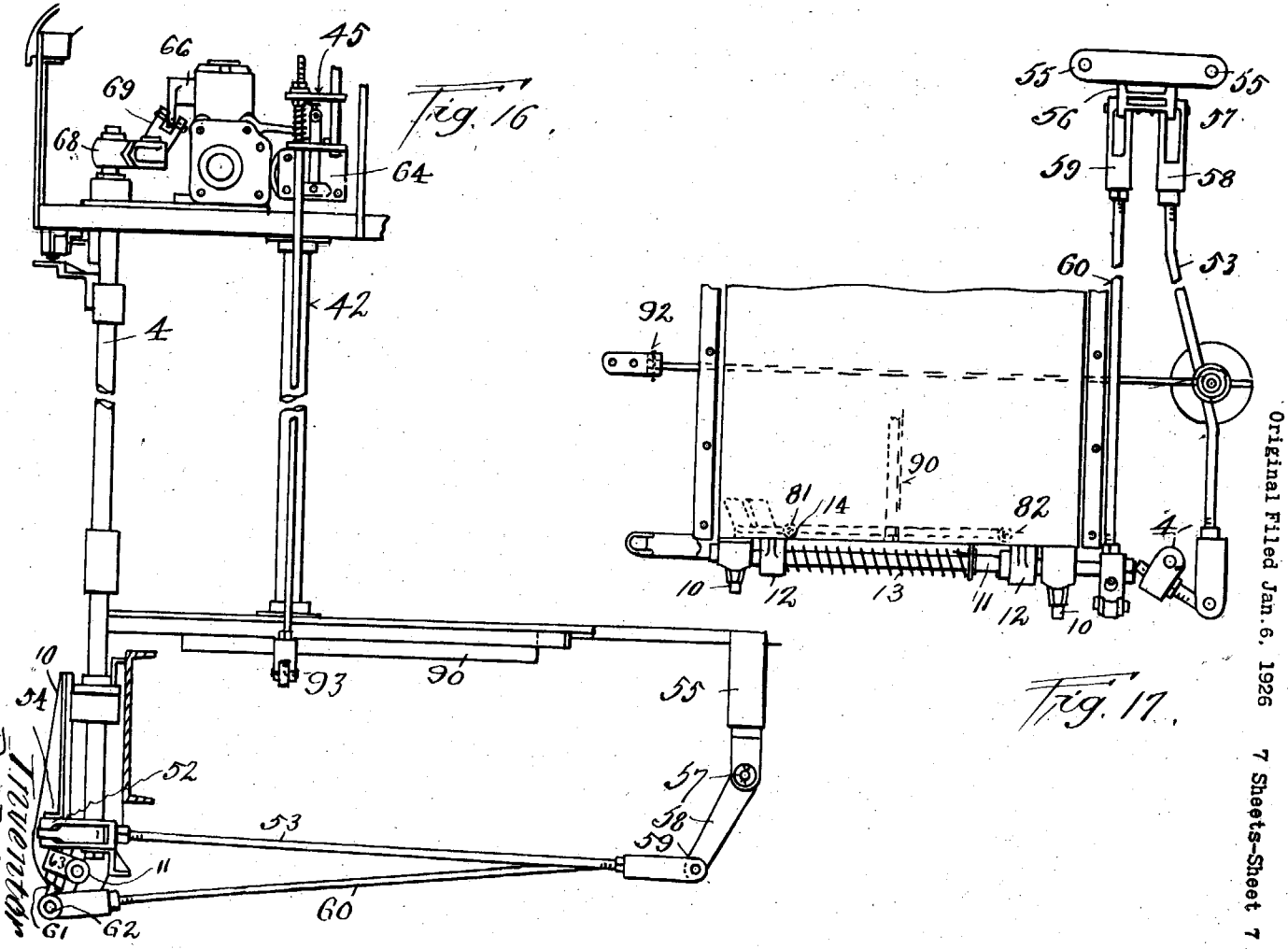
Inventor
Paris R. Forman
By his Attorneys Dealy & Dealy Reissued Jan. 17, 1928.

Re. 16,850

UNITED STATES PATENT OFFICE.

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA.

DOOR-OPERATING MECHANISM.

Original No. 1,601,732, dated October 5, 1926, Serial No. 79,596, filed January 6, 1926. Application for reissue filed November 1, 1926. Serial No. 145,676.

This invention relates to door operating mechanism and more particularly to such mechanism as is employed on passenger vehicles, such as street cars, busses, subways, and elevated cars and the like.

The object of the invention is to provide mechanism of the foregoing type which is simple in structure, economical of manufacture, installation and maintenance, and efficient in operation.

A further object of the invention is to provide a door operating apparatus which may be conjointly controlled by the motorman, conductor, or the like.

Further objects of the invention will appear more fully hereinafter.

The invention consists substantially in the combination, location and relative arrangement of parts, all as will be more fully described hereinafter and as shown by the accompanying drawings and finally pointed out in the appended claims.

Referring to the drawings:

Fig. 2 is a top plan view of the same.

Fig. 3 is an enlarged detail view in top plan of the brake control equipment of the car.

Fig. 4 is a fragmentary view in side elevation of the skeleton equipment embodying my invention.

Fig. 5 is an enlarged detail view of the same.

Fig. 8 is a plan view of the motorman's interlocking door control equipment.

Fig. 9 is a sectional view taken in the line 2—2, of Figure 8, looking in the direction of the arrows.

Fig. 10 is a view in front elevation of the same.

Fig. 11 is a plan view of the valve seat.

Fig. 12 is a plan view of the valve.

Fig. 13 is a plan view of the valve head superposed on its seat with dotted line indications of the respective positions of the valve.

Fig. 14 is a fragmentary enlarged view similar in side elevation and similar to Figure 1 of a modified arrangement embodied in my invention.

Fig. 15 is a sectional view taken on the line 9—9, of Figure 14, and looking in the direction of the arrows.

Fig. 16 is a skeleton view in side elevation of the modified construction.

Fig. 17 is an enlarged detailed view in plan of the same.

The same part is designated by the same reference character wherever it occurs throughout the several views.

In passenger vehicle operation efforts have been made in practically every department to reduce operating expense, particularly by the elimination of all unnecessary employees. As a result thereof, so-called one man cars have been developed wherein the single employee acts as conductor and motorman. With the elimination of the conductor, the duties of the motorman have correspondingly increased, so that while theretofore the sole duty of a motorman was to control the progress of the vehicle, in one man car equipment, the motorman must in addition thereto control the doors, make change and collect all fares. Inasmuch as theretofore the safety of passengers in boarding and alighting from the car was largely under the supervision of the conductor, the addition of the normal duties of the conductor to the inherent duties of the motorman had a great tendency to slow up the schedule of operation of the vehicle, or developed carelessness with respect to and disregard for the safety of the passengers with the inevitable accidents, consequent loss of time and expense.

As a result efforts have been directed to make the total number of duties of the one man operation of the vehicle as light as possible and more or less automatic and to interlock the various operating controls under his manipulation, so that safety is insured at all times while at the same time speed of operation is maintained.

One development has been the so-called treadle equipment, where a depressible platform and treadle has been provided for controlling the door actuation, so that when a passenger desired to leave the vehicle when the same had been brought to rest, the passenger by walking on the treadle would automatically open the door. By providing safeguards to prevent accidental opening of the door by the motorman or a passenger when the car or vehicle is in motion, the safety to the passengers is secured and the advantage of such semi-automatic operation obtained.

My present invention is directed to this type of equipment namely of the treadle one man control type of vehicle. In equipment of this nature heretofore proposed extremely expensive and complicated apparatus was necessitated and the cost of manufacture and expense of installation was such as to make the adoption of the system practically prohibitive.

It is among the special purposes of my present invention to provide equipment of this nature of such simplicity and minimum of parts, but nevertheless with ruggedness and durability and practically no expense of maintenance, as to render commercially practical a system of this nature with all of its incident advantages.

Figure 1:
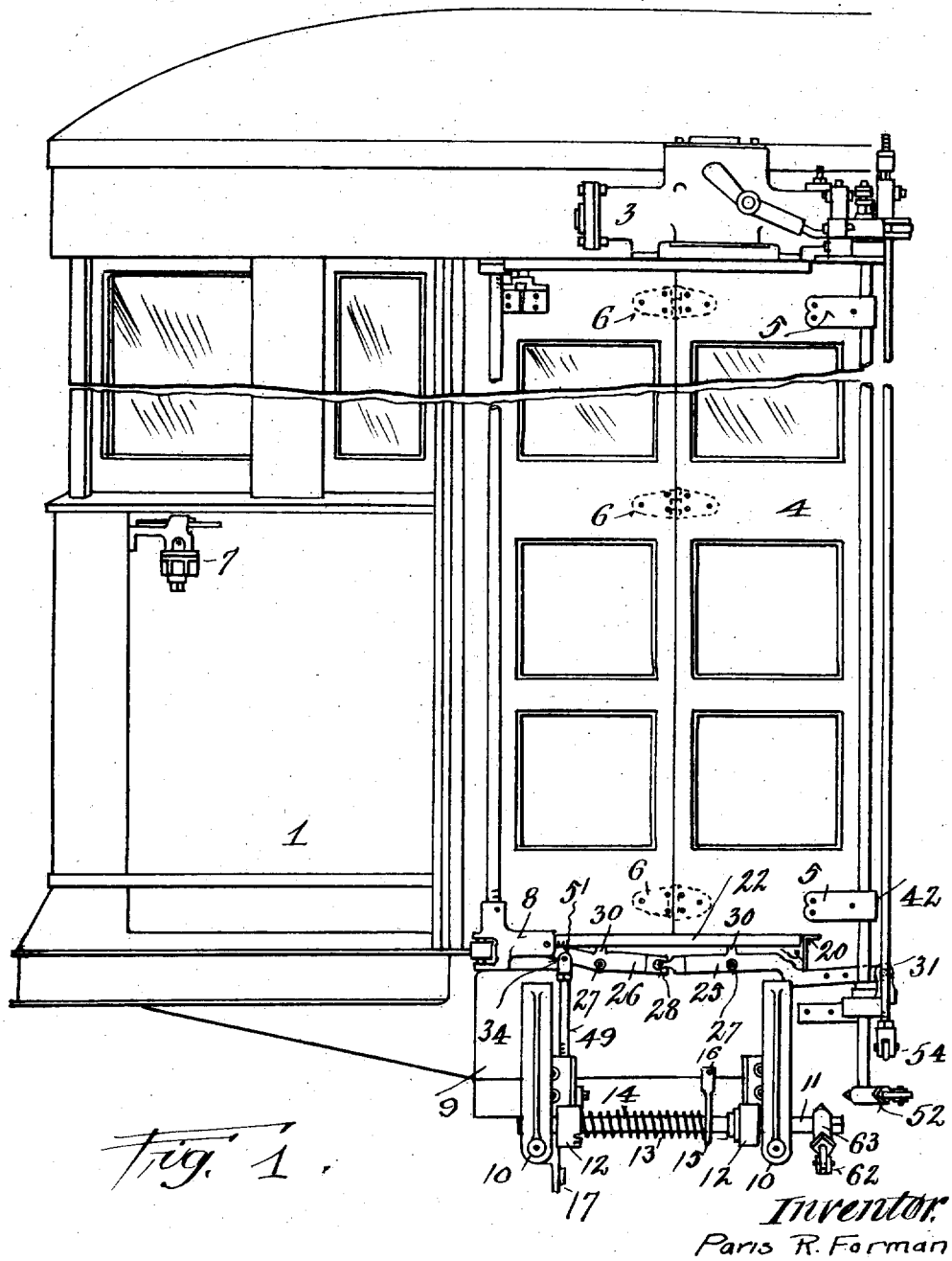
Fig. 1 is a fragmentary view in side elevation of a car end showing equipment embodying my invention.

Referring now to Figures 1 to 7, inclusive, which show one form of pneumatic treadle control and more particularly to Figure 1, the forward end of a street car is shown at 1. 2, 2 are the folding doors operable by the usual and well known door engine 3 through the vertical shaft 4. The right hand door 2 is rigidly attached by the plates 5 which encircle it to shaft 4. The left hand door 2 is hinged to the right hand door 2 as at 6. The motorman's door control valve is shown in general at 7. The forward door 2 is guided at the bottom by the plate and roller 8. The step comprising tread 9, and arms 10, is rotatively mounted on the horizontal rod 11 which is mounted in the bearings 12 supported by the frame of the car. The steps rotate downwardly against the action of the coiled spring 13 which tends to maintain the step in closed position. One end 14 of the spring 13 is connected to the bearing 12 and the other end 15 exerts a pressure on the step through the arm 16. The rear end of one arm 10 has an extension 17 which contacts with the arm (see Fig. 4) for a purpose which appears later. The motorman's power control is shown generally at 19.

Referring to Figure 2, the treadle mechanism is shown enlarged. 20 is an opening on the edges of which are angle irons 21 to line the opening. In the opening 20 is pivotally mounted flush with the floor the treadle plate 22 on the shaft 23 on which the plate is free to rotate. The shaft 23 is mounted in the angle iron 21. On the under side of plate 22 is riveted an angle iron 24 extending transversely across it. By this arrangement it is apparent that the plate 22 is depressible at its forward end.

Figures 6, 7:
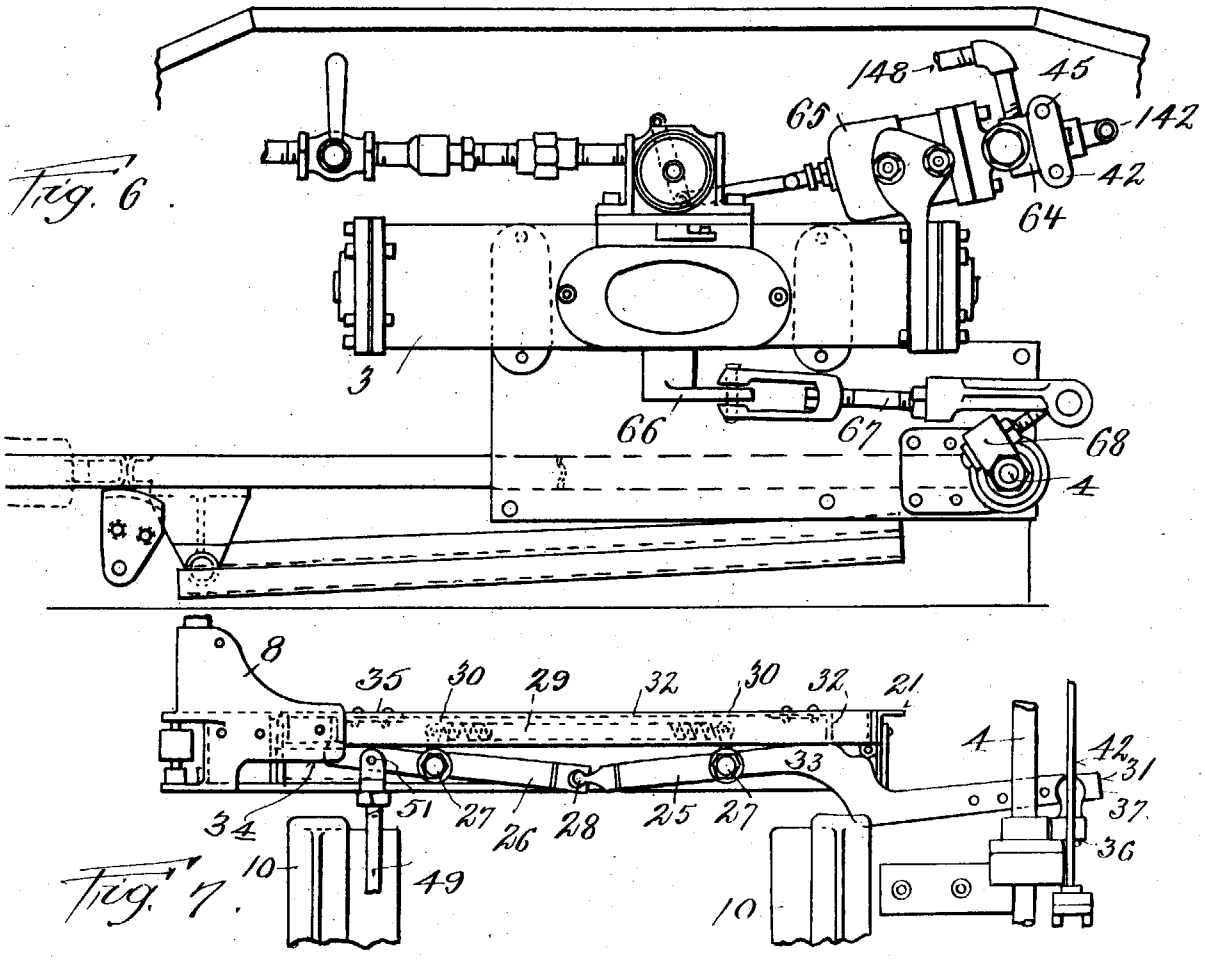
Fig. 6 is a top plan view of the door engine and apparatus shown in Figure 4.
Fig. 7 is an enlarged view of the treadle platform employed in accordance with my invention.

Immediately under the plate, approximately at the center and extending transversely across the door entrance are two arms 25 and 26 pivotally mounted at 27 intermediate at their ends and connected together by a ball and socket joint 28. These two levers 25 and 26 are connected together at their top by a spring 29 attached between the lugs 20 on the arms 25, 26. This spring tends to keep the levers at one limit of their movement, that is in depressed position. By this construction, whenever the plate 22 is depressed by reason of a passenger standing on it, the free end 31 of lever 25 is depressed being in contact with the angle plate 32 at 33 (Figure 7). The free end 34 of arm 26 is likewise in contact with an angle plate 35 attached to the under side of the treadle plate 22. Thus the ball and socket joint 26 will be raised against the action of the spring 29 whenever plate 22 is depressed. The free end 31 is pivotally connected to a link 36 at 37 (Fig. 5). The other end of link 36 is pivotally connected to a rotatable link 38 at 39 which is mounted on a bracket 40 for rotation. The bracket 40 being rigidly fastened to the car frame 41, a vertical rod 42 is pivoted at the center of the link 38 at 43. The rod 42 is movable vertically in the stanchion 44. The upper end of rod 42 is rigidly attached to plate 45 (Figure 4) which controls the needle valve of the door engine in the usual manner. This permits the operation of the door engine when the motorman's valve 7 is in brakes applied position, as will be hereinafter described.

Referring now to the extension 17 on the arm 10 of the door step, it is seen in Figures 4 and 5 that the arm 17 forces the end 18 of levers 46 upwardly, thus depressing the free end 47 downwardly about the pivot 48. Connected near the free end 47 of the lever 46 is a link 49 which is attached at 50. The other end of the link 48 is secured by a pivot pin to the lever 26 at 51. By this arrangement, it will be seen that when the last passenger leaves the plate 22 and stands on the step the arms 25 and 26 will remain in their displaced upward position causing the rod 42 to hold the needle valve open so that the doors will remain open until the step is cleared.

Mounted on the engine rotated vertical shaft 4 is a short arm and collar 52 to which is pivotally attached the arm 53 at 54. Rigidly secured to the frame of the car, and under the floor is the bracket 35 with two projecting arms 56 through which a shaft 57 extends. Secured to the shaft 57 for rotation with it are two arms 58 and 59 to the former of which is pivotally connected the link rod 53 at 59. Pivotally connected to the arm 59 is another link rod 60. The other end of rod 60 is attached to a short link 61 at 62 and said link 61 being attached to a collar 63 secured to step shaft 11.

The operation of the device will now be given. The motorman's valve is assumed to be in brakes applied and door opening position. When a passenger signals his desire to get off the car, he proceeds to the door and stands on the floor plate 22. The motorman stops the car sets the brakes at the car station with the result that the operation of the doors is controlled by a passenger or passengers wishing to leave the car. The plate 22 is depressed at its forward end causing the ball and socket joint 28 to rise against the action of spring 29, and causing the free end 31 of arm 25 to rotate downwardly about the axis 27. This forces link 38 downwardly about the pivot in bracket 40 carrying the rod 42 and its attached plate 45 with it. This causes the needle valve 64 to operate the control valve 65 which in turn admits air to the door engine 3 causing the piston to move and with it the crank 66, link 67 and crank 68 which is fastened to the vertical shaft 4. Shaft 4, therefore, rotates causing the doors to open. As the doors are opened by the rotation of shaft 4, the rigidly attached collar 52 rotates with it forcing rod 53 back. Since rods 53 and 60 are rigidly attached to the shaft pin 57, arm 59 moves backward with arm 58 drawing rod 60 with it and rotating shaft 11 through the agency of the arm 61 and collar 63. The step is thus rotated to a horizontal position by the time the doors are open. The passenger then alights on the step which maintains the door engine in its door opening position by forcing the free end 47 of lever 46 downward through the pressure exerted by arm 17 on arm 18 which is the other end of lever 46 rotatable about the pivot 48. Rod 49 is pulled downward by free end 47 and carries with it free end 34 of lever 26 by reason of their attachment at 51. This has all happened as the door and step were operated and is thus maintained when the passenger is on the step. When the step is cleared the spring 31 tends to raise the step and spring 29 depresses the ball and socket joint 48 causing a reverse operation of rod 42 and needle valve 64 so that air is led to the other side of the door engine piston which closes the door and step. The motorman can through the agency of valve 7 also open the doors to admit passengers when there is no one wishing to get off. Thus it appears that by this invention the opening and closing of the doors is all accomplished by the passengers wishing to leave the car.

I will now describe the valve arrangement employed by the motorman to control the operation of the doors through the treadle or independently thereof as desired. As has been briefly described and as shown in Figure 2, the valve 7 is associated with the pneumatic brake valve 19 and is specifically shown in detail, Figures 8 to 13, inclusive. The valve itself is composed of a main body portion 2′ having an extension 3′. The body portion 3′ comprises the frame 4′ on which is mounted the horizontal extension 5′ extending rearwardly thereof. Within the extension 5′ is a chamber 6′ which houses a piston 7′ having a series of leather discs 8′ mounted on a stud 9′ and held thereon by means of a nut 10′. On the other face of the piston is a projection 11′ having a reduced portion 12′ with a conical end which protrudes through the end wall 13′ of the chamber. A spring 14′ encircles the extension 11′ between the piston 7′ and the end of the chamber 6′. A threaded plug 15′ is screwed into the open end of the chamber 6′ which renders it air tight. The valve stem 17′ which is provided with one flat surface to receive a handle 18′ to be operated thereby is encircled by a coil spring 20′. The spring 20′ is within a housing 21′ which slips on to the stem 17′, between the portion 4′ of the valve and the handle 18′ and has its ends 22′ bearing against the main body portion 4′, of the valve. The spring casing 21′ turns with the stem 17′ and carries one end of the spring 20′ with it in accordance with the direction in which the stem turns while the other end bears against the body portion 4′. Thus, the spring resists any effort to turn the valve stem in either direction and maintains the valve handle normally in its central position indicated at B in Figures 11 and 13.

The valve seat 23′ is formed on the lower surface of the main body portion 4′ which is threaded at 24′ to receive a threaded cap nut 25′, which is forced against a washer 26′. The valve head 27′ is forced against the valve seat 23′ by means of a spring pressed thimble 28′. This thimble projects through an opening in the wall 30′ of the cap nut 25′. The stud 31′ is made with a cavity 32′ into which a threaded plug 33′ is screwed. The spring 34′ rests against this plug at one end and within the thimble at the other. Thus, it is evident that the thimble is slidable in the wall 30′ of the cap nut and forces the valve head 27′ against the valve seat by means of spring 34′. The port 16′ communicates through the passage 36′, 37′ with the chamber 38′, formed by the cap nut 25′. A threaded opening 39′ is provided in the valve body to have screwed thereinto a pipe 39ᵃ (see Fig. 2) communicating with the brake cylinder so that when brakes are applied fluid pressure is supplied from the brake cylinder to port opening 39′, and flows through a passage 40′ to port 41′ opening in the valve face 23′. A similar threaded opening 42′ is screwed thereinto, a pipe 42ᵃ (see Fig. 2) which conducts fluid pressure therefrom to the port at 42 of the valve puller of the door engine (see Fig. 6). Within the valve body the port opening 42′ is connected with the port opening 43′ by a passage. Another threaded opening 48′ is adapted to have screwed thereinto the end of pipe line 42ᵃ (see Fig. 2) which terminates in the pipe 148 (see Fig. 6) leading to the valve puller of the door engine. The opening 48′ is connected with the port 50′ by means of a passage 49′. A passage 51′ at right angles to passage 49′ leads to the atmosphere and is threaded at its outer end as is indicated.

Referring now to the valve operation which is best shown in Figures 11, 12 and 13, the valve head has two semi-circular grooves 52′ and 53′ in its face. Another groove 54′ leads radially into groove 53′.

In the other views as has been pointed out with reference to Figures 2 and 13, there are three positions for the door control valve head. When the valve is in the position shown indicated at C in Figures 2 and 13 air under pressure enters opening 39′, and then travels through passage 40′, port opening 41′, groove 52′, passage 49′, threaded opening 48′, pipe 48ᵃ (see Fig. 2) to pipe 148 (see Fig. 6) to the valve puller of the engine to open the door. It will be noted, however, that this passage to the door engine is in back of the needle valve, so that there is thus afforded to the motorman means for opening the door wholly independent of the treadle equipment.

When the lever 18′ is moved to position A and the brakes are applied fluid pressure flows through opening 39′, at 39ᵃ (see Fig. 2) passage 40′, port 41′, groove 52′, port 43′, passage 44′, opening 42′, chamber 38′, and thence to the pipe line 142 to the valve puller on the door engine. The fluid pressure is here blocked, however, because of the needle valve and the valve puller becomes operative only when the needle valve is depressed due to the presence of a passenger on the treadle. If the passenger is on the treadle and the needle valve depressed then and only in that event will the valve puller of the engine be operative and the engine actuated. As heretofore explained actuation of the door motor in each instance requires that the brakes be applied inasmuch as the fluid pressure is derived from the brake cylinder through the pipe line 39ᵃ only when the brakes are applied. The fluid pressure supplied to the valve holds the valve handle in its displaced position, against the action of the coil spring 20′. As soon as the fluid pressure is released (i. e. the brakes are released) the spring 20′ causes the valve handle 18′ to move back to its normal position indicated at B in Figures 2 and 13, thereby causing the door engines to actuate the doors to closed position.

It will be seen from the foregoing that I have supplied an exceedingly simple and efficient arrangement for effecting simple treadle and motorman control of the door apparatus requiring a minimum of parts.

In installing the equipment of this nature on certain types of cars great difficulty is met with in getting around the normal obstructions, ordinarily located beneath the car and finding adequate space for the additional equipment necessary for treadle operation.

For this reason I have shown and will now describe a modified arrangement wherein any obstructions beneath the car cause no difficulty inasmuch as the operating equipment is located all in alignment with the vertical edge of the car with the exception of two operating rods, the location of which may be altered to meet the necessity or desirability.

Referring, therefore, to Figures 14 to 17; as before the usual door engine 3 is mounted overhead and operatively connected to the vertical door opening shaft 4 mounted in bearings and attached to the doors 2, 2, by the plate and collar 5. The doors are hinged at 6, and are guided by the roller and plate 8 at the bottom. The step 9 is supported on arms 10, 10 fixed for rotation with horizontal shaft 11 in the frame bearings 12. The spring 13 is mounted on shaft 11 and is fastened to the bearing 12 at 14 and at the other end to arm 15 attached to the bottom side of the step 9. This spring opposes the downward action of step 9. The rear ends of arms 10 project for a short distance as at 69 and are jointed by bar 70 bolted to them. At the center of this bar is a spring pressed bolt 71 for a purpose which will appear later. A spider 72 is bolted to the outside face 73 of the knee of the platform at 74, 74, which acts as a support for the levers 75, 76 pivoted at 77, 78 respectively. The free ends 79, 80 of levers 75 and 76 are pivotally jointed to two vertically movable rods 81, 82 which are pressed upwardly by springs 83, 84, held between collars 85, 86 and the spider, and which are in contact with the floor treadle 22 on the under side. The plate or treadle 22 is inlaid flush with the floor within an opening 20 framed by angle irons 21, said plate being pivoted as before near the rear end. The levers 75 and 76 are pivoted together at their inner ends at 87 and also pivoted at 87 is a depending bar 88 which slides in a guide 89 on the lower end of the spider. The lower end of bar 88 contacts with the bolt 71 when the step is down for a purpose which will appear later.

Extending longitudinally of the plate 22 on its underside is an angle iron 90 which contacts with lever 91 when the plate is depressed. The lever 91 is pivoted at the left end at 92 in a bearing mounted on the car frame. The rod 42 is pivotally connected at 93 to the free end of lever 91.

The operation is similar to that previously given. When the motorman's valve is in brakes applied position and the door valve is in its A position, the weight of the passenger depresses the forward end of plate 22 which forces rods 81 and 82 downward and the inner ends of levers 75 and 76 upward drawing bar 88 up with them. The same depression of plate 22 carried angle iron 90 down against lever 91, forcing its free end down pulling rod 42 down with it. The door engine operates as before opening the doors and step in exactly the same manner as described before. When the step is all the way down, the bolt 71 contacts with the lower end of the bar 88 to hold the joined ends of levers 75 and 76 upwards when the passenger transfers his weight from the plate 22 to step 9.

The important feature of the modification is the compactness of the parts used and the simplicity of the mechanism. Also there are practically no parts under the car floor since they are all mounted on the knee of the platform.

Many modifications and changes in detail will readily appear to those skilled in the art without departing from the spirit and scope of my invention as defined in my claims.

Having now set forth the objects and nature of my invention and having shown and described the structures embodying the features thereof, what I claim as new and useful and of my own invention and desire to secure by Letters Patent is:—

1. In a vehicle, entrance and exit ways, barrier means in said ways, means operable by a passenger for opening said exit barrier comprising a hinged treadle plate depressible by the weight of a passenger, and pivoted levers depressible by the treadle plate, said levers being connected by their inner end by a ball and socket joint, said levers being operable to energize said door opening means.

2. In a vehicle, entrance and exit ways, barriers for said ways, means for opening said exit barrier, a treadle plate, pivoted levers mounted under said treadle with the inner ends joined by a ball and socket joint, the free end of one of said levers being connected to a pivoted arm, a step, and means on said step whereby said arm maintains the ball and socket ends of the levers raised when the passenger leaves the treadle plate and alights on the step.

3. In a vehicle, entrance and exit ways, barriers for said ways, means operable by a passenger for moving said exit barrier, a step, and means operable by the presence of a passenger on said step for retaining said barrier open when the passenger leaves said barrier opening means.

4. In a vehicle, entrance and exit ways, barriers for said ways, means operable by the weight of a passenger for opening said exit barrier, a step, said barrier opening means becoming effective when the brakes are applied, means for maintaining said barriers open operable by the step, and means for returning said barriers to closed position when the step is clear.

5. In a vehicle, entrance and exit ways, barriers for said ways, a hinged treadle plate, pivoted levers under said treadle, said levers being joined by their adjacent ends by a ball and socket joint, means operable by said treadle for raising said ball and socket joint, a step, means for maintaining said ball and socket joint raised operable by said step, means operated by said levers for admitting fluid pressure to said barrier opening means and means to return said barrier means to closed position when the step is cleared.

6. In a vehicle, entrance and exit ways, barrier means for said ways, a step, means for opening and closing said barriers and step, means operated by the act of a passenger for opening said exit barrier and step comprising a treadle plate, ball and socket jointed pivoted levers under said treadle, means operated by said levers for operating said barrier opening means, when the brakes are applied, and means for closing said barriers and step when the step is cleared.

7. In a vehicle, entrance and exit ways, barriers for said ways, means operable by an act of a passenger when the brakes are applied for opening and closing said barriers, means operable by the motorman for opening and closing said barriers when the brakes are applied, said passenger opening means comprising a hinged treadle plate, pivoted levers depressible at their outer ends by said treadle for operating said barrier opening and closing means, a step and means operated by said step for retaining said barriers open when the treadle is cleared.

8. In a vehicle, entrance and exit ways, barriers for said ways, means operable by the act of a passenger for opening said exit barriers comprising a treadle plate, a spider under said treadle, pivoted levers on said spider, said levers being pivoted together at their inner ends, and means operated by the depression of the treadle for raising the inner ends of said levers whereby the barrier operating means is energized.

9. In a vehicle having entrance and exit ways, barriers for said ways, means for operating said barrier operating means, a treadle plate, a spider mounted under said treadle, levers pivoted on said spider, said levers pivoted at their inner ends, a guide in said spider, a pivoted arm depending from said levers, a step, said treadle plate being so arranged that the weight of a passenger depresses the outer end of said pivoted levers, and means on said step cooperating with said depending arms for maintaining the outer ends of said pivoted levers depressed when a passenger transfers his weight to the step, said barrier operating means being connected, by means for energizing it, to the pivoted levers.

10. In an interlocked passenger and motorman operated barrier system means for opening the barriers in the entrance and exit ways of a vehicle, and pneumatic means actuated by an application of the brakes in combination with a system of levers influenced by the weight of a departing passenger for opening said barriers, said means also being so arranged as to function to open and close the doors independent of the act of a passenger.

11. In a car barrier control system pneumatic means operated by the fluid pressure in the air brake line when the brakes are applied for opening said barriers, passenger controlled means for opening said barriers when the brakes are applied and automatic means for closing said doors when the last passenger has alighted.

12. In a car barrier control system, barriers in the entrance and exit ways of the car, treadle control means actuated by an act of a passenger for opening said exit barrier when the brakes are applied, and means for permitting the normal operation of said treadle means, only when the brakes are applied, said means also providing barrier opening and closing means independent of said treadle means.

13. In a valve and treadle control system for the operation of the barriers in a one-man car, pneumatic engines for operating the barriers, means comprising a safety valve operated by the motorman and means comprising a treadle operated by the weight of a passenger for opening the barriers said two means being interlocked so as to cause the door engines to function only when the brakes are applied.

14. In a motorman's valve, a body portion having a seat thereon, a stem having a valve head thereon, spring means for holding the valve in neutral position, and air operated means for holding the valve in other than neutral position when the brakes are applied.

15. In a device of the character described, a body portion having a rearwardly extending chamber, a piston in said chamber, a stem, a spring and housing secured to said stem, and means on said piston for holding said stem in operative position.

16. In a motorman's valve a main body portion having a valve seat thereon, a stem mounted in said body portion and having a valve seat thereon, a casing enclosing said seat and head and means for holding said valve in inoperative position when the air brakes are applied.

17. In a control valve, a seat having ports therein, a head having grooves registering with said ports, means for moving said head relatively to said seat, means for resisting this movement and means for maintaining said ports in moved position.

18. In a control valve, a seat having ports therein, a head having grooves therein, means for rotating said head relatively to said seat, means for resisting said rotation and an operated means for maintaining said valve in rotated position.

19. In a three position valve, a stem, a spring on said stem, a housing for said spring, air operated plunger means arranged to hold said housing in any one of three positions, whereby the valve is operative only while there is pressure in the air brake line.

20. In a three position valve a lever operated stem having a valve head thereon, a body portion having a valve seat thereon, air operated means for maintaining said valve in any one of its three positions, means for returning said valve to inoperative position when said air means becomes inoperative and means for returning said air operated means to inoperative position when the air pressure in the brake line is exhausted.

21. In a vehicle having entrance and exit ways, barriers in said ways, a treadle plate, a step, means mounted on the knee of said step comprising a spider and a system of levers mounted on said spider and operated by said treadle for opening said step and barriers when the brakes are applied, said system of levers controlling the admission of fluid pressure to the door engines, the apparatus being so arranged as to eliminate all obstructions under the platform of the vehicle.

22. In a vehicle having entrance and exit ways, barriers in said ways, means operated by the motorman and means controlled by an act of a passenger interlocked with said first means so as to be operable when the brakes are applied for opening said exit barrier, said first means comprising a pneumatic valve for admitting air brake pressure under the control of said second means to the door engines for operating said barriers.

23. In a vehicle having exit and entrance ways, barriers in said ways, a pivoted treadle plate mounted in the platform floor of said vehicle, a spider mounted on the knee of the platform, levers on said spider and under said treadle, and a pivoted lever depressible by said treadle for operating the door engine needle valve to admit air to the door engines when said treadle is depressed by the weight of a passenger, said levers acting when the step is supporting a passenger to maintain said treadle depressed, and acting to return the treadle when the ways are clear, said treadle controlled mechanism being operable only when the brakes are applied, and said device being so mounted as to form no obstructions under the platform of the car.

PARIS R. FORMAN.